(12) United States Patent
Jin

(10) Patent No.: US 7,658,500 B2
(45) Date of Patent: Feb. 9, 2010

(54) SHUTTER OPENING AND CLOSING APPARATUS FOR BEAM PROJECTOR

(75) Inventor: Dae Keun Jin, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 622 days.

(21) Appl. No.: 11/439,195

(22) Filed: May 24, 2006

(65) Prior Publication Data

US 2006/0268232 A1 Nov. 30, 2006

(30) Foreign Application Priority Data

May 25, 2005 (KR) .................. 10-2005-0043899

(51) Int. Cl.
*G03B 21/14* (2006.01)
*G03B 11/04* (2006.01)
*G02B 23/16* (2006.01)

(52) U.S. Cl. ...................... 353/119; 359/511
(58) Field of Classification Search ............. 353/119, 353/97, 88, 100, 101, 122; 359/511; 396/448; 455/575.8; 379/433.11, 433.12, 433.13; 352/204, 207

See application file for complete search history.

(56) References Cited

U.S. PATENT DOCUMENTS

| 7,021,773 | B2 * | 4/2006 | Ishino .................. 353/119 |
| 7,070,285 | B2 * | 7/2006 | Wu ..................... 353/97 |
| 7,344,255 | B2 * | 3/2008 | Hara et al. .............. 353/88 |
| 7,438,486 | B2 * | 10/2008 | Ho ..................... 396/448 |
| 2003/0152381 | A1 * | 8/2003 | Tanabe .................. 396/448 |
| 2005/0030493 | A1 * | 2/2005 | Wu ..................... 353/119 |
| 2007/0274029 | A1 * | 11/2007 | Lee et al. .............. 361/679 |

* cited by examiner

*Primary Examiner*—William C Dowling
*Assistant Examiner*—Ryan Howard
(74) *Attorney, Agent, or Firm*—Birch, Stewart, Kolasch & Birch LLP

(57) ABSTRACT

A shutter opening and closing apparatus for protecting a projection lens of a beam projector, wherein a shutter member is provided at an exterior case for selectively opening and closing an opening for exposing the light output surface of the projection lens and a driving unit mounted separately from the shutter member for driving the shutter member whereby the apparatus can be used as a wall hanging slim beam projector or a stand-up type slim beam projector capable of operating with a reduced consumption of electricity because of its compact, light-weight construction.

21 Claims, 6 Drawing Sheets

SHUTTER OPENING AND CLOSING APPARATUS FOR BEAM PROJECTOR

This application claims priority to an application filed in the Korean Industrial Property Office on May 25, 2005, and assigned Serial No. 10-2005-0043899, the contents of which are incorporated herein by reference.

BACKGROUND OF THE INVENTION

1. Field of the Invention

The present invention relates to an optical lens shutter opening and closing apparatus for a beam projector, and more particularly to a shutter opening and closing apparatus for protection of a projection lens of a projector. Specifically, the present invention relates to a projection lens shutter opening and closing apparatus specifically applicable to a slim type wall-hanging or stand-up type beam projector.

2. Description of the Related Art

A recent increasing trend has been observed with respect to the distribution of projectors capable of obtaining image information via a large screen in order to satisfy the demands of consumers as broadcasting via high definition television is revitalized and markets of home theater apparatus are expanding.

As typical examples of projectors, beam projectors largely utilized for presentation by being connected, for example, to a computer, have been widely marketed and have already become popular. These types of beam projectors are operated in such a manner that the image matrix is projected with illuminating lights onto a large scale screen by Digital Mirror Devices (DMDs), or by Liquid Crystal Devices (LCDs) in a fixed-in-space projection beam.

Typically, a projection lens of a beam projector is exposed toward an opening formed in such a manner that its light output surface is opened at an exterior case. The opening is opened and closed by a shutter in response to an operation mode of the beam projector to thereby conceal and protect the projection lens during a stop mode.

Referring to FIG. 1 where a shutter opening and closing apparatus for protecting a projection lens in a conventional projector is illustrated. An opening 12 formed at a front case 10 for exposing a light output surface of a projection lens (not shown) is selectively opened and closed by a planar shutter member 20.

The shutter member 20 is reciprocally disposed at a bottom surface of the front case 10. A driving unit 30 for reciprocally moving the shutter member 20 is mounted on the shutter member 20.

The driving unit 30 includes a forward/reverse rotation driving motor 32, a gear train connected to an output axis of the driving motor 32, and a pinion 36.

The pinion 36 is meshed with a rack gear 40 disposed at a bottom surface of the front case 10. Furthermore, the rack gear 40 is arranged in the moving direction of the shutter member 20. Elements 50 and 52 denote guide members for guiding the reciprocal movement of the shutter member 20.

There is a disadvantage in the shutter opening and closing apparatus for protecting a projection lens of a projector as constructed according to the prior art in that, because the shutter member 20 moves with the driving unit 30 mounted thereon, the shutter assembly set is increased in thickness, frustrating the manufacturing of an exterior case having a small-size, with a light weight, compact configuration.

Another disadvantage is that the driving load increased by the increased weight of the shutter assembly set results in the inevitable use of a large capacity motor with an associated increase in power consumption, exerting a bad influence on product reliability and quality.

Still another disadvantage is that the electrical wirings between the driving motor and a controller are lengthened, resulting in a cost increase and a subsequent quality instability.

SUMMARY OF THE INVENTION

The present invention is as directed to solving the afore-mentioned disadvantages involved in the conventional shutter opening and closing apparatus for protecting a projection lens of a beam projector, and accordingly it is an object of the present invention to provide a projection lens shutter opening and closing apparatus for a beam projector which is small in size, light in weight and possesses a compact configured product.

Another object is to provide a projection lens shutter opening and closing apparatus for a beam projector which is configured to provide good economy and reliability by promoting a restrained electrical power consumption, a reduction in manufacturing cost and product quality stability.

Yet another object of the present invention is to provide a slim type beam projector useable for wall hanging or stand up purposes by adopting a shutter opening and closing apparatus for the projection lens of the beam projector for accomplishing the afore-mentioned objects.

In accordance with the present invention, the projection lens shutter opening and closing apparatus for a beam projector comprises an exterior case provided with an opening for accommodating a projection lens for generating image information and projecting the information onto a screen in a large scale, a shutter member operatively associated with the exterior case for opening and closing the opening; and a driving unit operatively connected to the shutter member and disposed in a separately divided region of the exterior case for effecting the opening and closing of the shutter member.

According to the present invention, the driving unit comprises a driving motor capable of forward and reverse rotation, and a rack gear is associated with the shutter member, said driving motor being operatively connected to the rack gear for opening and closing the shutter member. Advantageously, a pinion is connected to an output axes of the driving motor, said pinion adapted to mesh with the rack gear.

According to one aspect of the present invention, the driving unit is preferably mounted with a support bracket disposed on the exterior case. Preferably, the rack gear is integrally formed at one side of the shutter member and at least one or more connecting gears and a clutch gear are disposed between the driving motor and the pinion.

In the projection lens shutter opening and closing apparatus thus structured, according to the present invention, the exterior case is preferably provided with guide means for guiding the reciprocal movement of the shutter member.

According to one aspect of the present invention, the guide means preferably comprises a first slit type guide rail formed at one lateral side of the shutter member and a guide shaft orthogonally (at right angle) disposed at either the exterior case or the support bracket for restraining a moving track of the shutter member by being inserted into the first slit type guide rail.

According to another aspect of the present invention the guide means further comprises guide sashes disposed at the exterior case for guiding the other side of the shutter member.

The guide sashes include second slit type guide rails complementally coupled to the other side of the shutter member and formed in the shape of slit grooves for allowing movement thereof.

According to the present invention, the exterior case is installed with rotation prevention means for preventing a free end of the shutter member from rotating when the shutter member completes the opening or the closing, and preferably, the rotation prevention means is a lug protrudingly extending from the exterior case.

Preferably, the shutter opening and closing apparatus for a beam projector according to another aspect of the present invention further includes breakaway prevention means for preventing the shutter member from breaking away from the exterior case when the shutter member is opened or closed. The breakaway prevention means includes a lug piece formed by being bent at one end of the support bracket, and the lug piece is preferably disposed at an upper side of the shutter member and spaced a predetermined distance apart from the shutter member.

According to another aspect of the present invention, the exterior case is formed to have a framed, slim type external appearance.

BRIEF DESCRIPTION OF THE DRAWINGS

Reference will now be made in detail to the preferred embodiments of the present invention, examples of which are illustrated in the accompanying drawings. Wherever possible, same reference numerals will be used throughout the drawings to refer to the same or like parts.

DETAILED DESCRIPTION OF THE INVENTION

Hereinafter, preferred embodiments of the projection lens shutter opening and closing apparatus for a beam projector according to the present invention will be described in detail with reference to the appended drawings.

Figure 1:
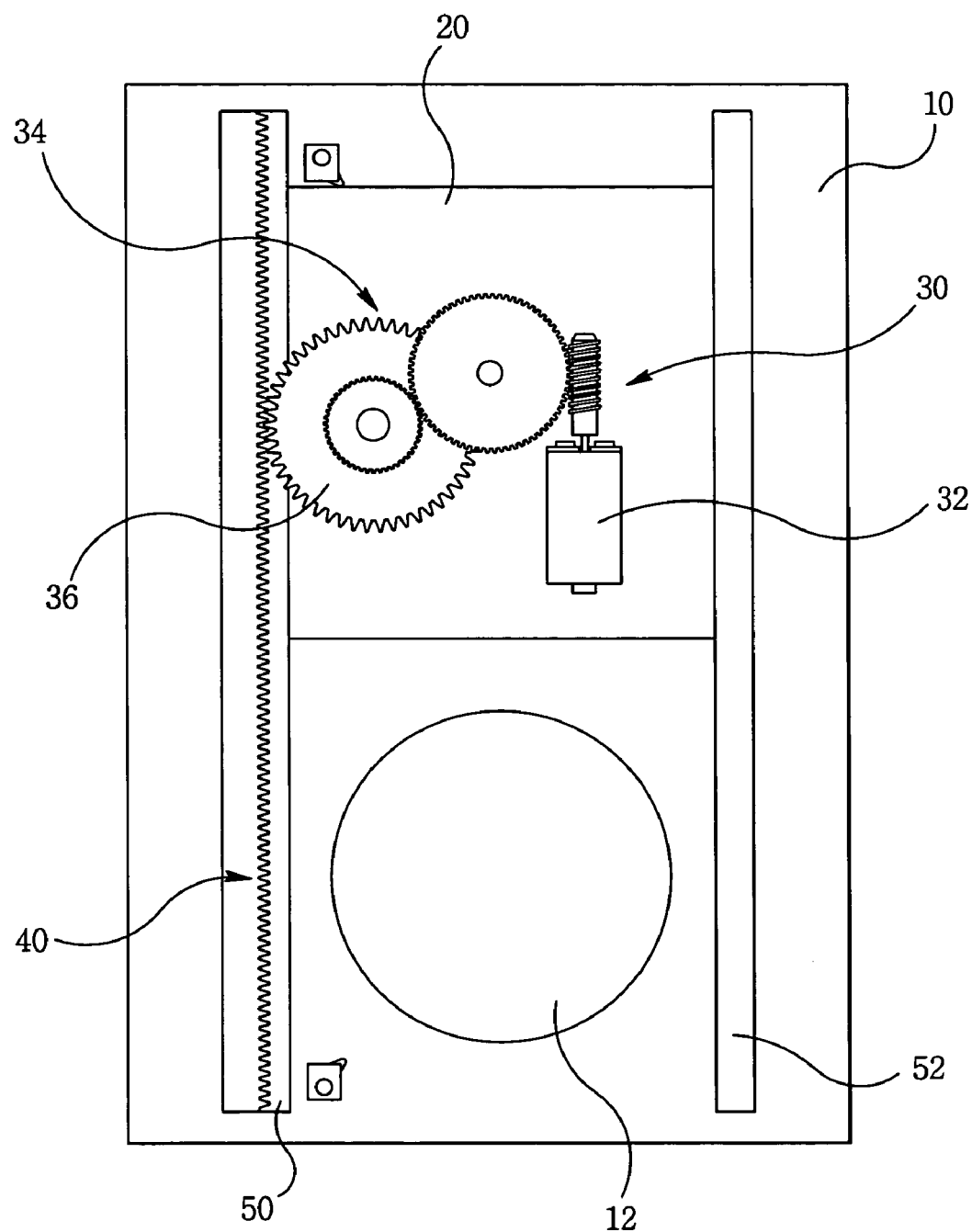
FIG. 1 is a plan structural view schematically illustrating a project lens shutter opening and closing apparatus for a beam project according to the prior art.
Figure 2:
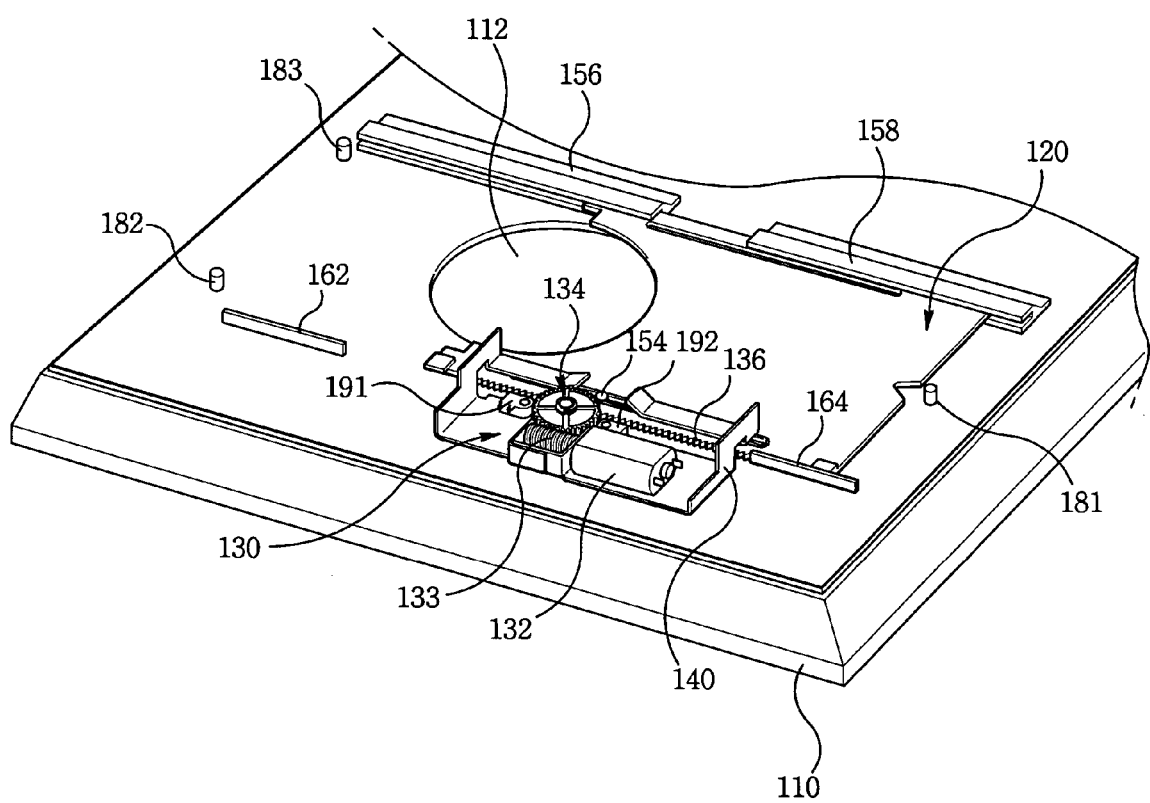
FIG. 2 is a schematic perspective view illustrating a projection lens shutter opening and closing apparatus for a beam projector according to the present invention.
Figure 3:
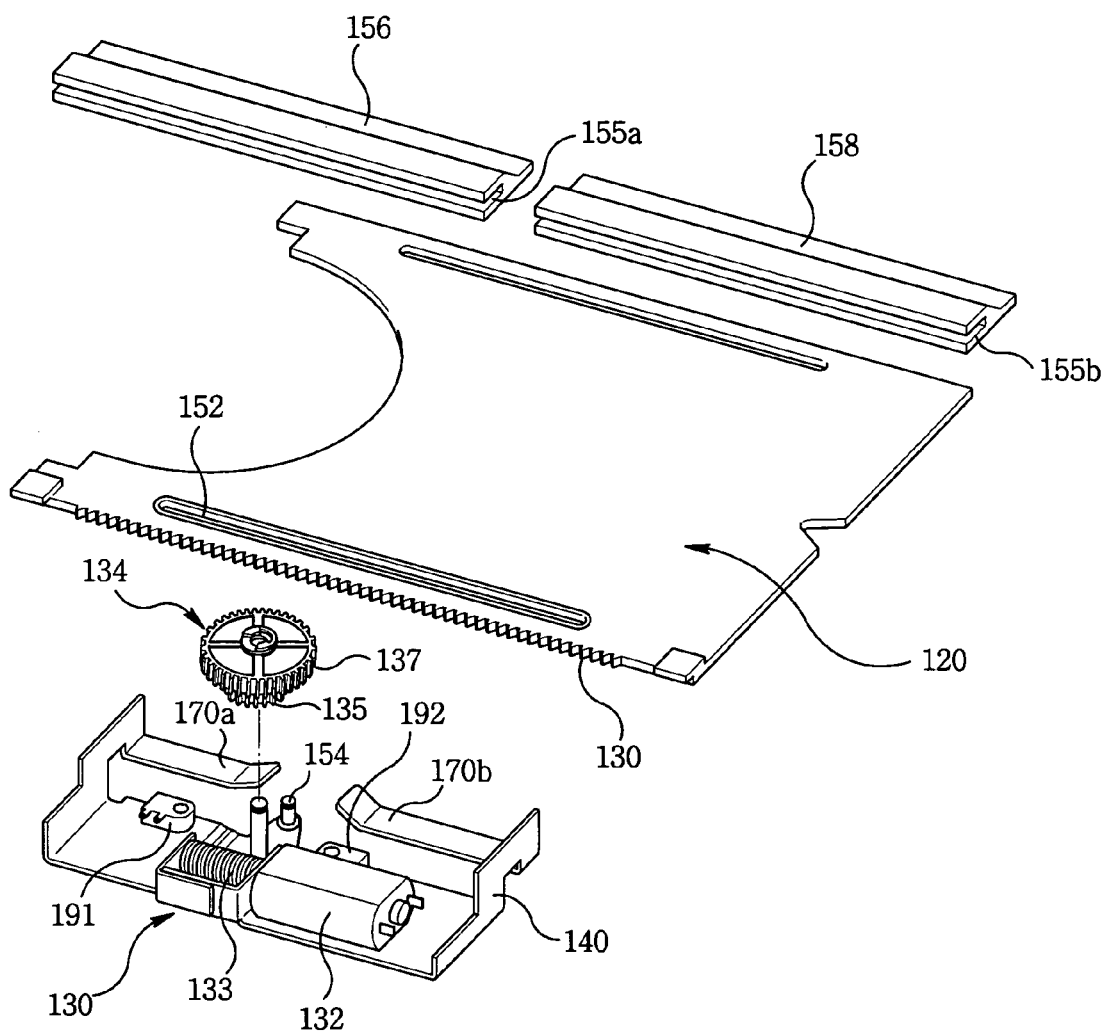
FIG. 3 is a schematic exploded perspective view of FIG. 2.

Referring to FIGS. 2 and 3, the projection lens shutter opening and closing apparatus for a beam projector according to the present invention includes an exterior case 110 having an opening 112 for exposing a light output surface of a projection lens (not shown), a planar shutter member 120 reciprocally disposed at a bottom surface of the external case 110 and a driving unit 130 supportably disposed at a bottom surface of the external case 110 for driving the shutter member 120.

According to the present invention, the driving unit 130 includes a driving unit 132 capable of forward and reverse rotation, a worm gear 133 disposed at an output axis end of the driving motor 130, a gear train 134 and a pinion 135 connected to the worm gear 133, and a rack gear 136 disposed at the shutter member 120 to be meshed with the pinion 135.

The driving unit 130 thus structured is disposed at a bottom surface of the exterior case 110 in a region divided separately from the shutter member 120.

Reference numeral 140 denotes a support bracket constituting a so called sub-assembly for supportably mounting the driving unit 130, but the present invention is not limited to presence or absence of the support bracket 140.

According to one aspect of the present invention, the rack gear 136 is preferably formed integrally with one side of the shutter member 120. Alternatively, the rack gear 136 is separately manufactured to be coupled to one side of the shutter member 120.

Furthermore, the gear train 134 is preferred to include at least one or more connecting gears and a clutch gear 137. The exterior case 110 is mounted with guide means for guiding reciprocal movement of the shutter member 120.

The guide means includes slit type guide rails 155a and 155b in which the other side of the shutter member 120 is movably coupled, and further includes guide sashes 156 and 158 disposed at the exterior case 110.

The exterior case 110 is equipped with rotation check means for preventing rotation of a free end of the shutter member 120 when the shutter member 120 reaches an open/close completion position.

According to one aspect of the present invention, the rotation check means are lugs 162 and 164 formed to protrude at the exterior case 110. The lugs 162 and 164 may be support members of various shapes for supporting the end of the shutter member 120.

According to another aspect of the present invention, the shutter opening and closing apparatus for the beam projector includes breakaway check means for preventing separation of the shutter member 120 from the exterior case 110 when the shutter member 120 reciprocatingly moves.

The breakaway check means includes a pair of lug pieces 170a and 170b which are bent at one end of the support bracket 140. Each of lug pieces 170a and 170b is disposed to be spaced a predetermined distance apart from an upper side of the shutter member 120.

Elements 181, 182 and 183 in FIG. 2 respectively represent stoppers for determining the position where the shutter member 120 is restrained and stopped.

Elements 191 and 192 in FIGS. 2 and 3 respectively represent open/close switches for determining the open or a closed state of the shutter member 120.

The operation of the projection lens shutter open/close apparatus for the beam projector according to the present invention will be now described in detail with reference to the accompanying drawings.

Figure 4A:
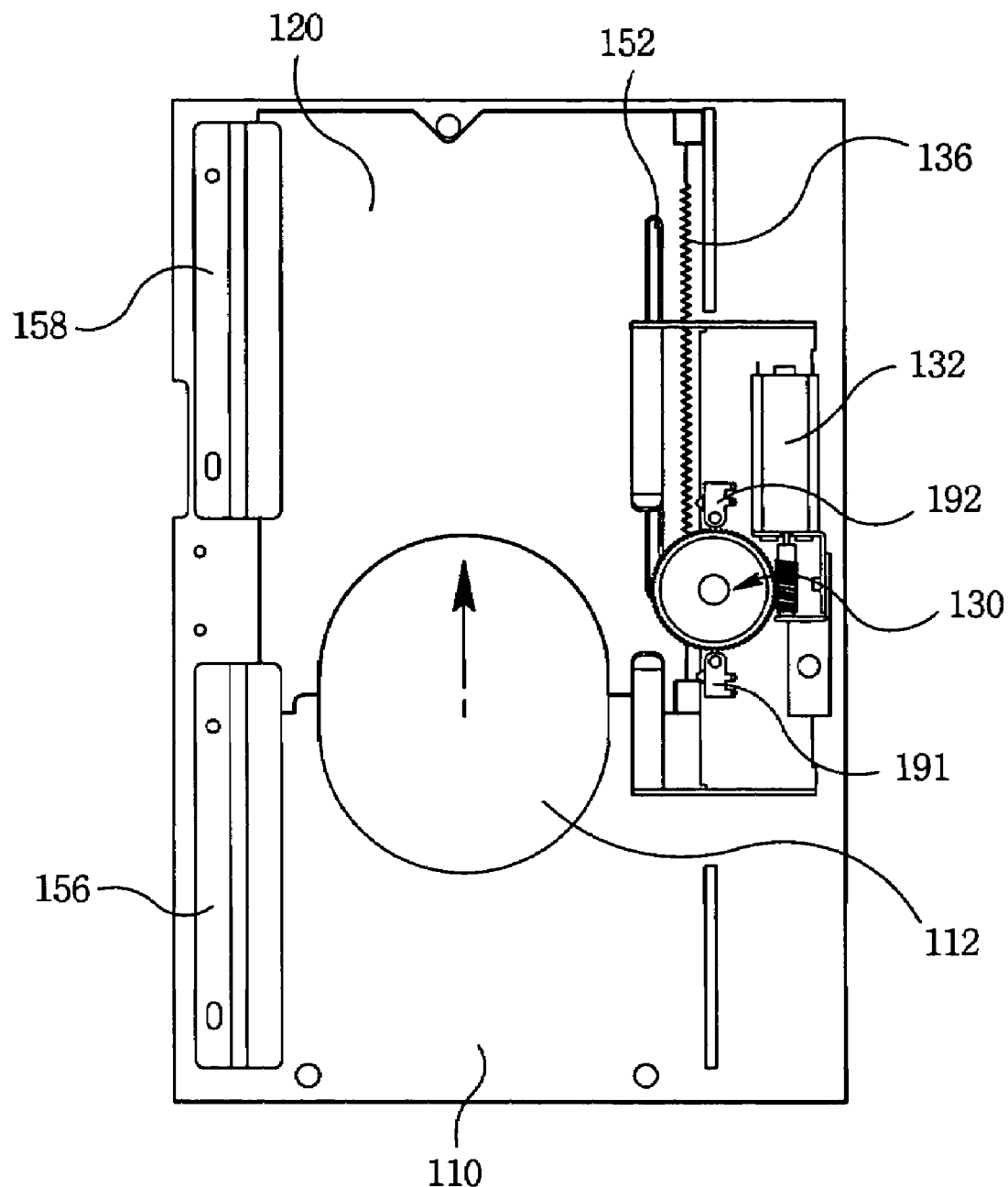
FIGS. 4A and 4B are schematic plan views illustrating an operation state of the projection lens shutter opening and closing apparatus for a beam projector according to the present invention.

Referring to FIG. 4A, a main driving switch (not shown) of the beam projector is turned on to drive the driving motor 132 to rotate either in the forward or reverse direction in response to a control signal of a main controller (not shown), whereby the gear train 130 and a pinion (not shown) are sequentially driven. As a result, the rack gear 136 which is meshed with the pinion (not shown) initiates a linear movement and simultaneously, the shutter member 120 coupled to the rack gear 136 starts to move in association therewith. The shutter member 120 then moves along the first slit type guide rail 152 and a second slit type guide rail (not shown) of the guide sashes 156 and 158 to allow the shutter member 120 to conduct an opening operation.

In the process of moving the shutter member 120 to an open position, the open/close switch 192 is operated to transmit signal information to the main controller (not shown), whereby the driving of the driving motor 132 is controllably stopped. As a result, the shutter member 120 is stopped in the open position 112.

Figure 4B:
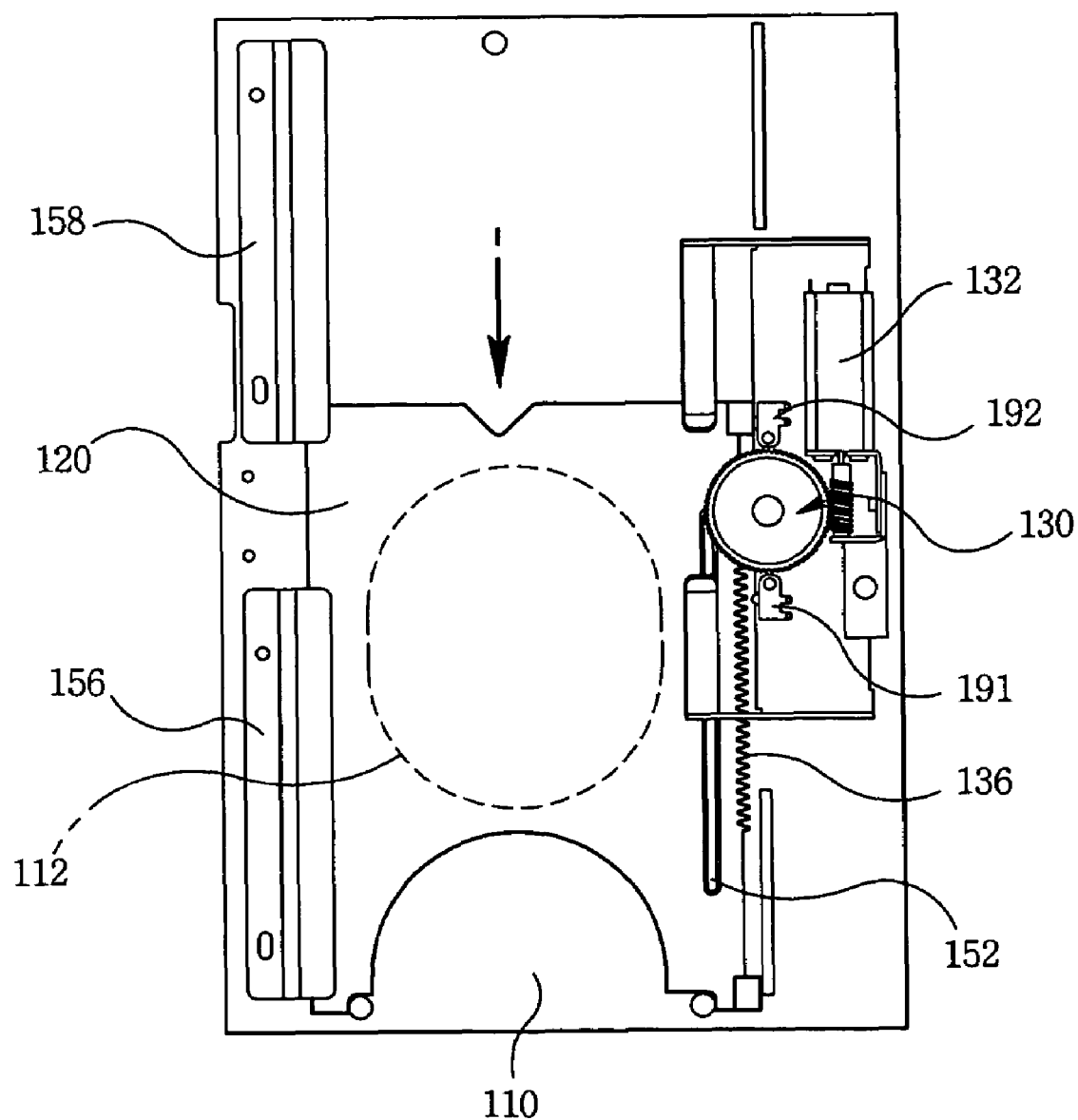

The shutting operation of the shutter member 120 is conducted in a reverse way to the opening operation of the shutter member 120 in which the shutter member 120 slides in a reverse manner to close the opening 112 as shown in FIG. 4B.

Thus the projection lens opening and closing apparatus for a beam projector according to the present invention is operated in such a fashion that the shutter member automatically opens and closes the opening as the shutter member and the driving unit are separately disposed.

Figure 5:
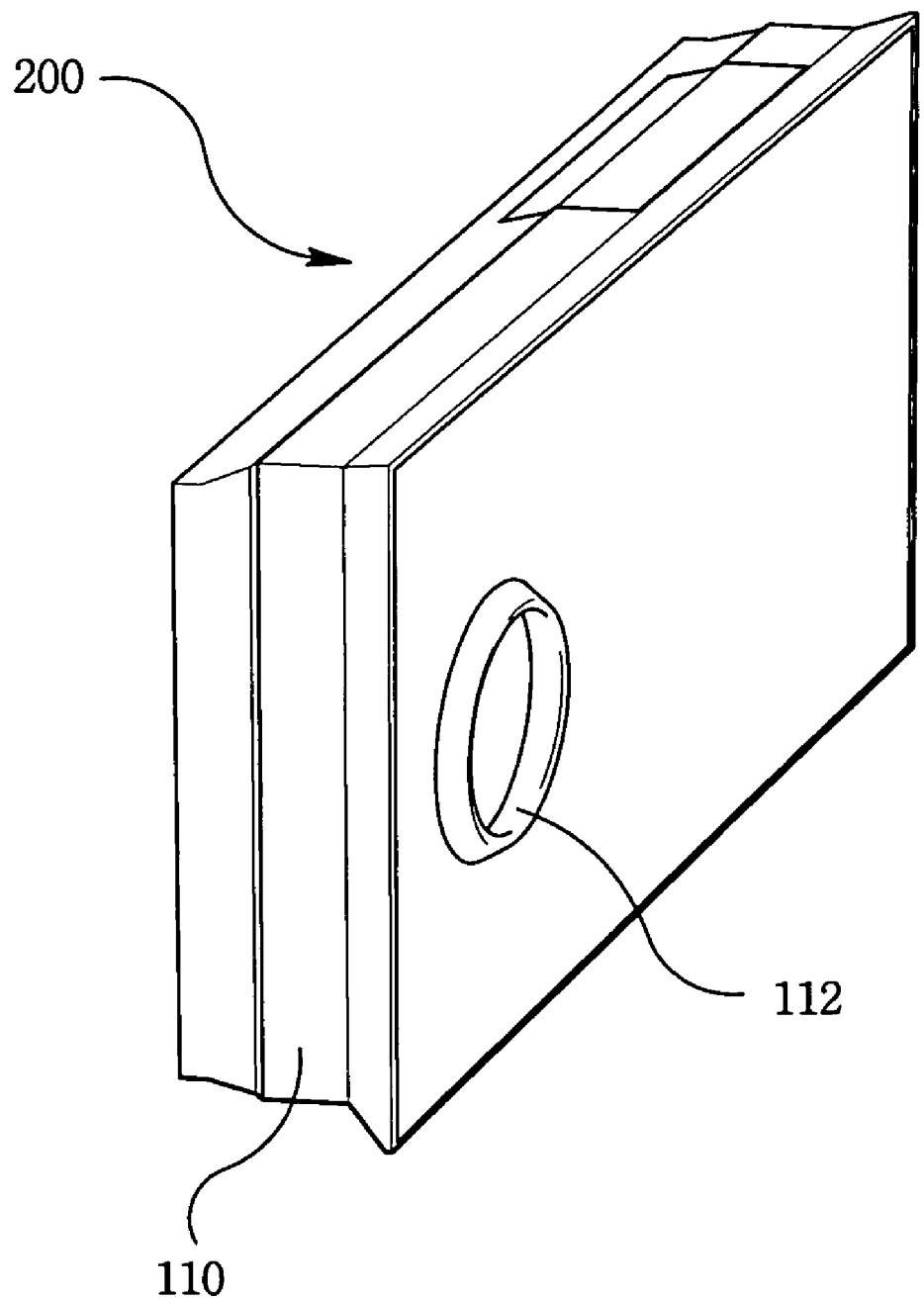
FIG. 5 is a schematic external perspective view illustrating a slim type beam projector for use as a wall hanging or for a stand-up purpose by adopting a shutter opening and closing apparatus according to the present invention.

FIG. 5 is a schematic external perspective view illustrating a so-called, a slim type beam projector 200 for use as a wall hanging or for stand-up purposes by utilizing a shutter opening and closing apparatus capable of slimming the exterior case 110 in accordance with the present invention.

There are a number of advantages in the projection lens shutter opening and closing apparatus for a beam projector structured according to the present invention. First, since the shutter member and the driving unit are separately constructed, a compact miniaturized manufacturing of the exterior case can be easily and effectively achieved by the reduced thickness of a shutter assembly set. Second, the driving load can be reduced by achieving a weight reduction of the shutter assembly set itself thereby which enables the utilization of a small motor with an associated reduced consumption of electricity. Third, the length of the wirings connecting the driving motor to the controller can be minimized to promote cost reduction and quality improvement.

It will be apparent to those skilled in the art that various modifications and variations can be made to the described preferred embodiments of the present invention without departing from the spirit or scope of the invention. Thus, it is intended that the present invention cover all modifications and variations consistent with the scope of the appended claims and their equivalents. Furthermore, to the extent that the term "includes" is used in either the detailed description or the claims, such term is intended to be similar to the term "comprising" as it is interpreted when employed as a transitional word in a claim.

What is claimed is:

1. A projection lens shutter opening and closing apparatus for a beam projector which comprises:
    an exterior case provided with an opening for accommodating a projection lens for generating image information and projecting the information onto a screen in a large scale;
    a shutter member operatively associated with the exterior case for opening and closing the opening; and
    a driving unit operatively connected to the shutter member and disposed in a separately divided region of the exterior case for effecting the opening and closing of the shutter member,
    wherein the exterior case is further provided with guide means for guiding the opening and closing movement of the shutter member,
    said guide means comprising a first slit type guide rail formed at one lateral side of the shutter member in the moving direction; a guide shaft supported to the exterior case to be inserted into the first slit type guide rail; and guide sashes having a second slit type guide rail in which the other side of the shutter member is coupled in movable state and disposed at the exterior case.

2. The apparatus of claim 1, wherein the driving unit comprises a driving motor capable of forward and reverse rotation, and a rack gear is associated with the shutter member, said driving motor being operatively connected to the rack gear for opening and closing the shutter member.

3. The apparatus of claim 2, wherein a pinion is connected to an output axes of the driving motor, said pinion adapted to mesh with the rack gear.

4. The apparatus of claim 1, wherein the exterior case further comprises a support bracket for supporting the driving unit.

5. The apparatus of claim 2, wherein the rack gear is integrally formed at one side of the shutter member.

6. The apparatus of claim 3, wherein at least one or more connecting gears and a clutch gear are interposed between the driving motor and the pinion.

7. The apparatus as defined in claim 1, wherein the exterior case comprises rotation prevention means for preventing a free end of the shutter member from rotating when the shutter member completes the opening or the closing thereof.

8. The apparatus as defined in claim 7, wherein the rotation prevention means is at least one lug extending from the exterior case.

9. The apparatus as defined in claim 4 further comprising breakaway prevention means for preventing the shutter member from breaking away from the exterior case when the shutter member is opened or closed.

10. The apparatus as defined in claim 9, wherein the breakaway prevention means comprises a lug piece formed by being bent at one end of the support bracket, and wherein the lug piece is disposed at an upper side of the shutter member so as to be spaced a predetermined distance apart from the shutter member.

11. The apparatus as defined in claim 1, wherein the exterior case is formed to have a framed panel external look.

12. A slim type beam projector comprising:
    an exterior case having a framed panel external look provided with a projection lens for generating image information and projecting the information onto a screen in a large scale, an opening for exposing the projection lens; and
    a shutter opening and closing unit for opening and closing the opening, wherein the shutter opening and closing unit comprises a shutter member reciprocally disposed at the exterior case for opening and closing the shutter member and a driving unit disposed at a region divided separately from the exterior case for reciprocally moving the shutter member,
    wherein the exterior case is provided with guide means for guiding the reciprocal movement of the shutter member,
    said guide means comprising a first slit type guide rail formed at one lateral side of the shutter member in the moving direction; a guide shaft supported to the exterior case to be inserted into the first slit type guide rail; and guide sashes having a second slit type guide rail in which the other side of the shutter member is coupled in movable stale and disposed at the exterior case.

13. The slim type beam projector as defined in claim 11, wherein the driving unit comprises a driving motor disposed at the exterior case and capable of forward and reverse rotation and a rack gear disposed at the shutter member, said driving motor being operatively connected to the rack gear.

14. The slim type beam projector of claim 13, wherein a pinion is connected to a output axis of the driving motor, said pinion adapted to mesh with the rack gear.

15. The slim type beam projector as defined in claim 12, wherein the exterior case further comprises a support bracket for supporting the driving unit.

16. The slim type beam projector as defined in claim 13, wherein the rack gear is integrally formed at one side of the shutter member.

17. The slim type beam projector as defined in claim 14, wherein at least one or more connecting gears and a clutch gear are interposed between the driving motor and the pinion.

18. The slim type beam projector as defined in claim 12, wherein the exterior case further comprises rotation prevention means for preventing a free end of the shutter member from rotating when the shutter member completes the opening or the closing operation.

19. The slim type beam projector as defined in claim 12 further comprising breakaway prevention means for preventing the shutter member from breaking away from the exterior case when the shutter member is opened or closed.

20. A projection lens shutter opening and closing apparatus for a beam projector which comprises:
- an exterior case provided with an opening for accommodating a projection lens for generating image information and projecting the information onto a screen in a large scale;
- a shutter member operatively associated with the exterior case for opening and closing the opening; and
- a driving unit operatively connected to the shutter member and disposed in a separately divided region of the exterior case for effecting the opening and closing of the shutter member, said driving unit comprising a driving motor capable of forward and reverse rotation, and a rack gear is associated with the shutter member, said driving motor being operatively connected to the rack gear for opening and closing the shutter member, wherein a pinion is connected to an output axes of the driving motor, said pinion adapted to mesh with the rack gear, and wherein at least one or more connecting gears and a clutch gear are interposed between the driving motor and the pinion.

21. A projection lens shutter opening and closing apparatus for a beam projector which comprises:
- an exterior case provided with an opening for accommodating a projection lens for generating image information and projecting the information onto a screen in a large scale;
- a shutter member operatively associated with the exterior case for opening and closing the opening; and
- a driving unit operatively connected to the shutter member and disposed in a separately divided region of the exterior case for effecting the opening and closing of the shutter member, said exterior case further comprising a support bracket for supporting the driving unit and a breakaway prevention means for preventing the shutter member from breaking away from the exterior case when the shutter member is opened or closed, wherein the breakaway prevention means comprises a lug piece formed by being bent at one end of the support bracket, and wherein the lug piece is disposed at an upper side of the shutter member so as to be spaced a predetermined distance apart from the shutter member.

\* \* \* \* \*